Figure 1:
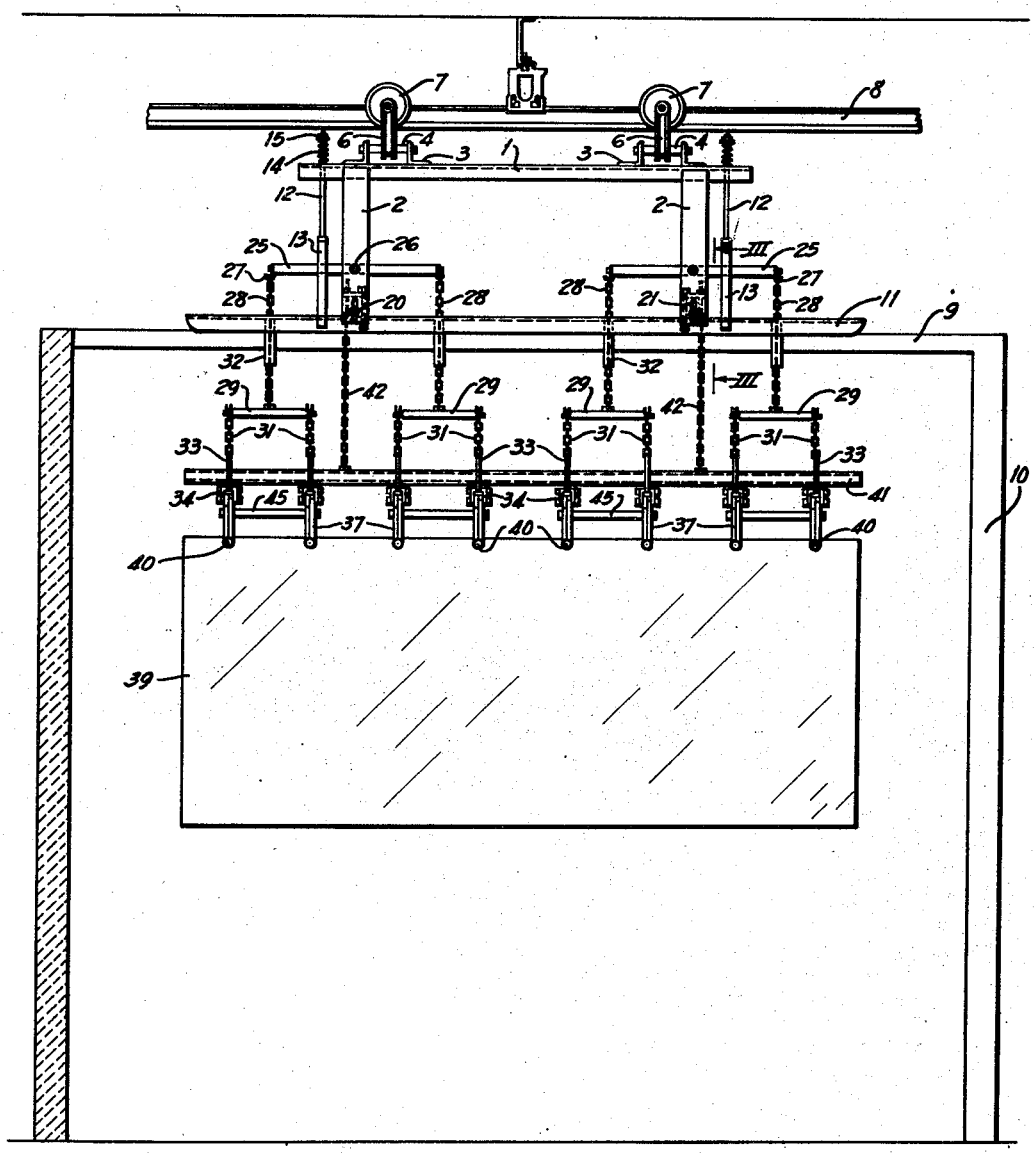

June 14, 1955 T. W. GLYNN 2,710,493
APPARATUS FOR SUSPENDING FLAT GLASS DURING HEAT TREATMENT
Filed Nov. 29, 1951 2 Sheets-Sheet 2

INVENTOR.
THEODORE W. GLYNN
BY
Brown, Critchlow, Flick & Peckham

United States Patent Office 2,710,493
Patented June 14, 1955

2,710,493

APPARATUS FOR SUSPENDING FLAT GLASS DURING HEAT TREATMENT

Theodore W. Glynn, Kingsport, Tenn., assignor to Blue Ridge Glass Corporation, Kingsport, Tenn., a corporation of New York Application November 29, 1951, Serial No. 258,832

3 Claims. (Cl. 49—45)

This invention relates to apparatus for suspending flat glass, such as glass door panels, during heat treatment.

In tempering sheets or panels of glass it is customary to support them near their upper edges by tongs suspended from some sort of carrier by which the glass can be moved into and out of a heat treating furnace. The common practice is to provide the tongs with adjusting screws, with the idea that they will permit the weight of the glass on every tong to be adjusted to substantially the same amount. However, it has been found that it is practically impossible to equalize the load on all of the tongs by such means, wherefore the glass sheet tends to warp or elongate at the pair of tongs which carries the heaviest load. Another difficulty has been that as the glass softens, the jaws of the tongs imbed themselves too deeply in the glass and weaken it. Stop screws on the tong handles have not proved satisfactory because their proper adjustment is too critical.

It is among the objects of this invention to provide flat glass suspending apparatus, in which the weight on all the tongs is equalized automatically, in which the tongs are all held in alignment lengthwise of the glass, and in which the correct pressure of the tongs against the glass is maintained at all times so that they can not imbed themselves in the glass when it becomes softened by heat.

In accordance with this invention a pair of longitudinally spaced, substantially horizontal upper arms have their central portions pivotally supported by rigid means above them to allow them to tilt lengthwise. Flexible members are suspended from the opposite ends of each arm, and a substantially horizontal lower arm is supported centrally by the lower end of each of those members. Additional flexible members are suspended from the opposite ends of each of the lower arms. Means are provided for connecting glass-gripping tongs, either directly or through still lower arms, with the lower ends of the last-mentioned flexible members. These connecting means preferably include frames, through which a straight bar extends. The bar is substantially in engagement with the opposite sides of the frames to hold them in alignment in a vertical plane, but the bar is spaced from the upper and lower ends of the frames so that it will not interfere with the self-equalizing feature of the apparatus. The glass-gripping tongs hang by their handles, and a rod below each lower arm has each of its end portions extending between the handles of one of the tongs and rests on them to hold the handles apart so that the jaws of the tongs can not press farther in the glass when it is softened heat. Preferably, the apparatus is provided with a horizontal closure bar for the slot in the top of the heat treating furnace, this bar being partially counterbalanced by springs.

Figure 2:
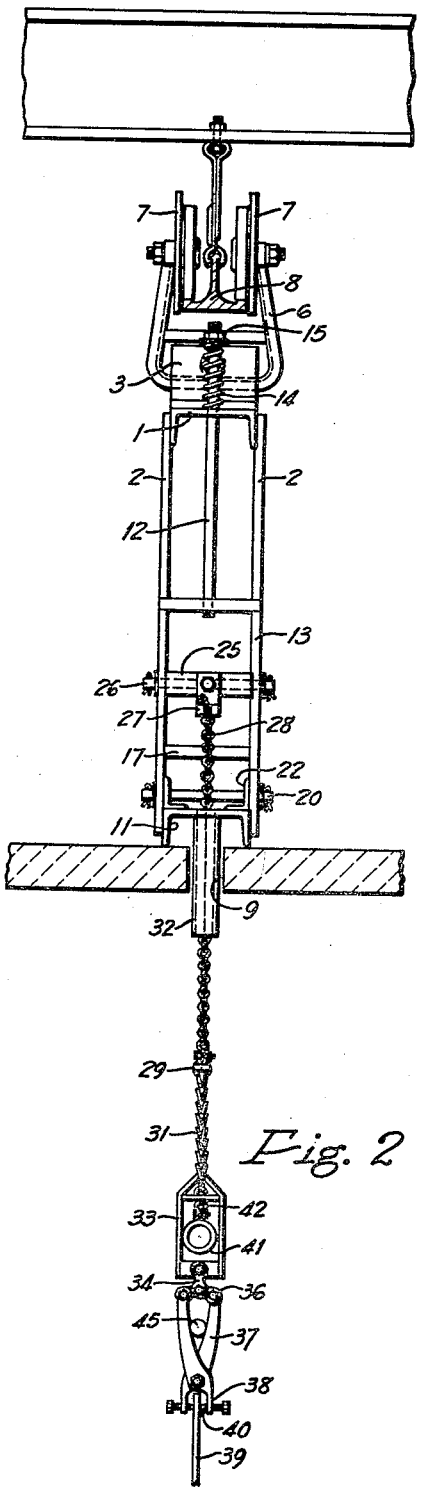
Figure 4:
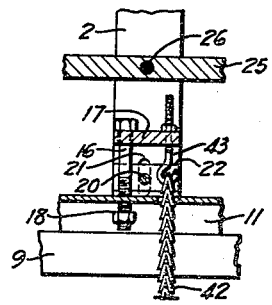
Figure 3:
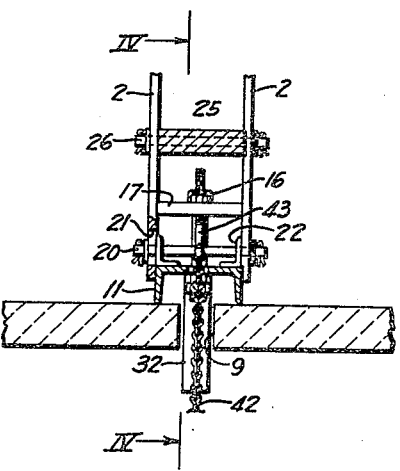

The preferred embodiment of the invention is illustrated in the accompanying drawings, in which Fig. 1 is a side view of my glass-suspending apparatus; Fig. 2 is an end view thereof; Fig. 3 is a fragmentary vertical section taken on the line III—III of Fig. 1; and Fig. 4 is a fragmentary vertical section taken on the line IV—IV of Fig. 3.

Referring to the drawings, a carriage is formed from a horizontal channel 1, from the opposite ends of which pairs of parallel legs 2 extend downward. Mounted on top of the channel are pairs of brackets 3, in which are journaled shafts 4 that extend lengthwise of the channel. The shafts have their central portions rigidly connected to the lower parts of yokes 6. The upper ends of the yokes are supported by trolley wheels 7 that run on a track 8 formed by the flanges of an inverted T-bar.

A portion of the track is directly over a slot 9 in the top of an annealing furnace which has a door opening 10 at one end. To close the furnace top slot when glass is in the furnace, a horizontal closure bar 11 is provided, which may be in the form of a channel. This channel is carried by the carriage above it, being suspended between the lower ends of each pair of legs 2 by means of vertical rods 12 and yokes 13. The rods support the yokes, and the lower ends of the yokes are welded to the opposite sides of closure bar 11. The upper ends of the rods extend slidably through carriage channel 1, and the rods are supported by coil springs 14 seated on that channel and engaged by nuts 15 on the upper ends of the rods. To prevent the closure bar from dropping too low in case springs 14 are not adjusted properly, bolts 16 (Fig. 4) extend down through horizontal plates 17 that connect the lower portions of legs 2. By screwing nuts 18 on the lower ends of these bolts up or down, the lowest level to which channel 14 can sink can be controlled. The channel is prevented from moving lengthwise across the carriage legs by means of cross pins 20 that extend through vertical slots 21 (Fig. 3) in the legs, the pins being mounted in brackets 22 welded to the top of the channel.

Extending between each pair of legs 2 above plates 17 is an upper arm 25, the central portion of which is connected to the legs by a pivot pin 26. Mounted on the ends of these arms are slotted hooks 27 which support the upper ends of metal chains 28. Stainless steel sash chain is suitable for this purpose. The lower end of each chain is connected to the center of a lower arm 29, the opposite ends of which are provided with laterally extending slots for receiving the upper ends of metal chains 31. The chains 28 extend down through holes in the closure bar and through vertical tubes 32 welded to the bottom of that bar. The tubes extend down through furnace slot 9.

The lower end of each of the chains 31 supports a metal frame 33 which has parallel sides, as shown in Fig. 2. The distance between those sides is considerably less than the height of the open space between them, for a reason that will appear presently. Connected to the bottom of each frame is a pair of vertical links 34, the lower ends of which are pivotally connected to the central joint of a toggle 36. The outer ends of the toggle are pivotally connected to the upper ends of the handles 37 of glass-gripping tongs. The jaws 38 at the lower ends of the tongs are adapted to straddle the upper edge of a sheet of glass 39. The jaws include round pointed screws 40 that engage the glass. The weight of the glass on the tongs causes the toggle to swing the upper ends of the handles toward each other so that the jaws will tightly grip the glass and support it.

With this arrangement of tongs the load on all of them will be self-equalizing; that is, each pair of tongs will bear the same weight. If one of the tongs suspended from a given lower arm 29 grips a sheet of glass at a lower point than the other tongs suspended from the same arm, the arm will merely tilt so that the weight on each of the tongs will be the same. If these two tongs grip the glass at a different level than the two pairs of tongs suspended from the other lower arm that is supported by the same upper arm 25 as the first one, the upper arm will tilt to equalize the tension on both lower arms. In this way no tongs support any more weight of glass than any other tongs. It also will be observed that the only pivot pins in the suspension system are located above closure bar 11, outside of the furnace, where they can be lubricated. Tilting of the lower arms inside the furnace is taken care of by the flexible chains.

To keep the tongs lined up in a vertical plane extending lengthwise of the glass 39, an aligning bar 41 extends through all of the frames 33 substantially in engagement with their opposite sides. Preferably, this bar is tubular to reduce its weight. To keep it from interfering with vertical self-adjusting movement of the tongs, it is suspended by chains 42 from hook bolts 43 anchored in the horizontal plates 17 between the pairs of carriage legs 2. This aligning bar is held at a height where it will be spaced substantially the same distance from the tops and bottoms of frames 33 when all of the frames are at the same level. The frames thus can move vertically a distance sufficient for equalizing the load on the tongs without striking the top or bottom of the bar.

Another of the problems encountered in tempering flat glass is the tendency of the tongs to bite too deeply into the glass when it is softened by heat in the furnace, due to the fact that the weight on the tongs continually urges their handles, and therefore their jaws, toward each other. This problem is solved in a simple but effective and automatic way in this apparatus by inserting a solid metal rod 45 between the handles of the tongs below each different lower arm 29. The opposite end portions of each rod are each supported by a different pair of tong handles. While the carriage and the glass suspended from it are being rolled into the furnace, the attendant vibration causes the rods to seat firmly against the inclined handles in the downwardly tapered space between them. The rods will then serve as blocks that prevent the handles from being moved any closer together, so the jaws of the tongs can not imbed themselves farther into the glass when it becomes softened in the furnace.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Apparatus for suspending flat glass during heat treatment, comprising a pair of longitudinally spaced substantially horizontal upper arms, rigid means above the arms pivotally supporting their central portions to allow them to tilt lengthwise, flexible members suspended from the opposite ends of each arm, a substantially horizontal lower arm supported centrally by the lower end of each of said members, flexible members suspended from the opposite ends of each of said lower arms, a rigid rectangular frame connected to the lower end of each of said last-mentioned flexible members, a straight aligning bar extending through all of said frames substantially in engagement with the opposite sides thereof, means suspending the bar spaced from the upper and lower ends of the frames, and glass-gripping tongs suspended from each of said frames.

2. Apparatus for suspending flat glass during heat treatment, comprising a pair of longitudinally spaced substantially horizontal upper arms, rigid means above the arms pivotally supporting their central portions to allow them to tilt lengthwise, flexible members suspended from the opposite ends of each arm, a substantially horizontal lower arm supported centrally by the lower end of each of said members, flexible members suspended from the opposite ends of each of said lower arms, glass-gripping tongs having jaws projecting from the lower ends of crossed handles, said tongs hanging by their handles from the lower ends of said last-mentioned flexible members, and a substantially round rod below each lower arm with each of its opposite end portions extending loosely between the handles of one of the tongs in frictional engagement therewith to hold said handles apart to keep the jaws of the tongs from pressing into the glass when it is softened by heat.

3. In apparatus for suspending flat glass during heat treatment, a row of substantially parallel glass-gripping tongs each having a pair of glass-engaging jaws projecting downward from the lower ends of a pair of crossed upwardly diverging handles, linkage means pivotally connected to the upper ends of each pair of handles to support the tongs so that the weight of glass supported by said jaws will tend to swing the upper ends of the handles in each pair toward each other, and a round rod extending loosely between the handles of each of the tongs in frictional engagement therewith to keep the jaws from moving toward each other from their initial spacing, whereby the jaws will not press into the glass when it is softened by heat.

References Cited in the file of this patent

UNITED STATES PATENTS

| | | |
|---|---|---|
| 1,343,057 | Lee | June 8, 1920 |
| 1,689,048 | Preston | Oct. 23, 1928 |
| 2,057,569 | Goodwillie | Oct. 13, 1936 |
| 2,100,512 | Kotowski | Nov. 30, 1937 |
| 2,103,850 | Hinsey | Dec. 28, 1937 |
| 2,156,011 | Despret | Apr. 25, 1939 |
| 2,170,749 | Forbes | Aug. 22, 1939 |
| 2,199,511 | Perry et al. | May 7, 1940 |
| 2,213,014 | Owen | Aug. 27, 1940 |

FOREIGN PATENTS

| | | |
|---|---|---|
| 473,604 | Great Britain | Oct. 15, 1937 |
| 506,723 | Great Britain | May 26, 1939 |